(12) United States Patent
Bryla

(10) Patent No.: US 7,319,194 B2
(45) Date of Patent: Jan. 15, 2008

(54) SYSTEM AND METHOD FOR SPLICING AN ELECTRICAL CORD

(76) Inventor: Mariusz Bryla, 2590 Argyle Road, Mississauga, Ontario (CA) L5B 1V3

( * ) Notice: Subject to any disclaimer, the term of this patent is extended or adjusted under 35 U.S.C. 154(b) by 0 days.

(21) Appl. No.: 11/070,892

(22) Filed: Mar. 3, 2005

(65) Prior Publication Data

US 2006/0196687 A1   Sep. 7, 2006

(51) Int. Cl.
*H01R 4/00* (2006.01)
(52) U.S. Cl. ..................... 174/84 R; 174/92
(58) Field of Classification Search ............... 174/36, 174/74 R, 74 A, 75 D, 77 R, 84 R, 84 S, 174/88 R, 88 S, 92
See application file for complete search history.

(56) References Cited

U.S. PATENT DOCUMENTS

| | | | |
|---|---|---|---|
| 1,909,248 A | | 5/1933 | Benkelman |
| 2,045,361 A | | 6/1936 | Leonard |
| 2,475,184 A | | 7/1949 | Hudson |
| 2,971,180 A | | 2/1961 | Colwell |
| 3,317,658 A | * | 5/1967 | Smith ............... 174/138 F |
| 3,317,883 A | | 5/1967 | Gourley et al. |
| 3,654,588 A | | 4/1972 | Ruth |
| 3,944,721 A | * | 3/1976 | Reeder ............... 174/88 R |
| 4,050,773 A | | 9/1977 | Newell |
| 4,091,233 A | * | 5/1978 | Berman ............... 174/88 R |
| 4,288,311 A | | 9/1981 | Singleton et al. |
| 4,586,774 A | | 5/1986 | Didier |
| 4,778,948 A | * | 10/1988 | Fitch et al. ............... 174/88 R |
| 5,618,200 A | | 4/1997 | Norgaard |
| 5,695,369 A | | 12/1997 | Swenson, Sr. |
| 5,863,220 A | | 1/1999 | Holliday |
| 5,989,058 A | | 11/1999 | Norgaard |
| 6,220,893 B1 | | 4/2001 | Stephan |
| 6,796,853 B1 | | 9/2004 | Tomasino |
| 6,814,630 B1 | | 11/2004 | Tomasino |

FOREIGN PATENT DOCUMENTS

DE   WO 97/37263   * 10/1997
JP   64-16209   * 4/1992

* cited by examiner

*Primary Examiner*—William H. Mayo, III
(74) *Attorney, Agent, or Firm*—Bereskin & Parr; Isis E. Caulder

(57) ABSTRACT

A device for splicing two electrical cords. The device includes a connecting body for electrically coupling wires of a first electrical cord to wires of a second electrical cord. A first protrusion at one end of the connecting body for securing the first cord has a portion that is lodged inside the first cord. Likewise, a second protrusion at another end of the connecting body for securing the second cord has a portion lodged inside the second cord.

24 Claims, 9 Drawing Sheets

SYSTEM AND METHOD FOR SPLICING AN ELECTRICAL CORD

FIELD OF THE INVENTION

This invention relates to devices for electrical equipment, and more specifically to a system and method for splicing an electrical cord.

BACKGROUND OF THE INVENTION

Electrical cords are sometimes accidentally severed due to various mishaps. For example, a gardener may inadvertently run over an electrical cord with a lawn mower causing the cord to sever into two pieces. Instead of replacing the cord, the cord can be spliced using any one of several known methods. Perhaps the most primitive involves simply using electrical tape to reattach the cords together. This method is not always safe and may not meet safety standards. Besides electrical tape, other devices exist for splicing electrical cords, but these too have drawbacks, such as being too bulky, too costly, or too prone to breaking.

Aside from the need to splice cords because of accidental severing, it is also sometimes necessary to splice electrical cords during the normal course of an electrician's employment. For example, when a building is electrically wired during construction, it is sometimes necessary to operatively connect electrical cords to achieve an appropriate length.

For these reasons, a device for splicing electrical cords that is safe, effective and relatively inexpensive would be most welcome.

SUMMARY OF THE INVENTION

Described herein is a method and device for splicing two electrical cords. The device includes a connecting body for electrically coupling N wires of a first electrical cord to N wires of a second electrical cord, where N is an integer greater than zero. A first protrusion at one end of the connecting body has a portion that is lodged inside the first cord to secure the first cord. Similarly, a second protrusion at another end of the connecting body secures the second cord. During electrical operation of the coupled electrical cords, the first and second protrusions are non-conducting, i.e., the first and second protrusions do not carry electricity during operation.

Also described herein is a method for splicing two electrical cords. The method includes electrically coupling N wires of a first electrical cord to N wires of a second electrical cord within a connecting body. The method further includes lodging inside the first cord at least a portion of a first protrusion disposed at one end of the connecting body for securing the first cord. Likewise, at least a portion of a second protrusion disposed at an opposite end of the connecting body is lodged inside the second cord for securing the second cord. During electrical operation of the coupled electrical cords, the first and second protrusions are non-conducting.

DETAILED DESCRIPTION OF THE INVENTION

Figure 1A:
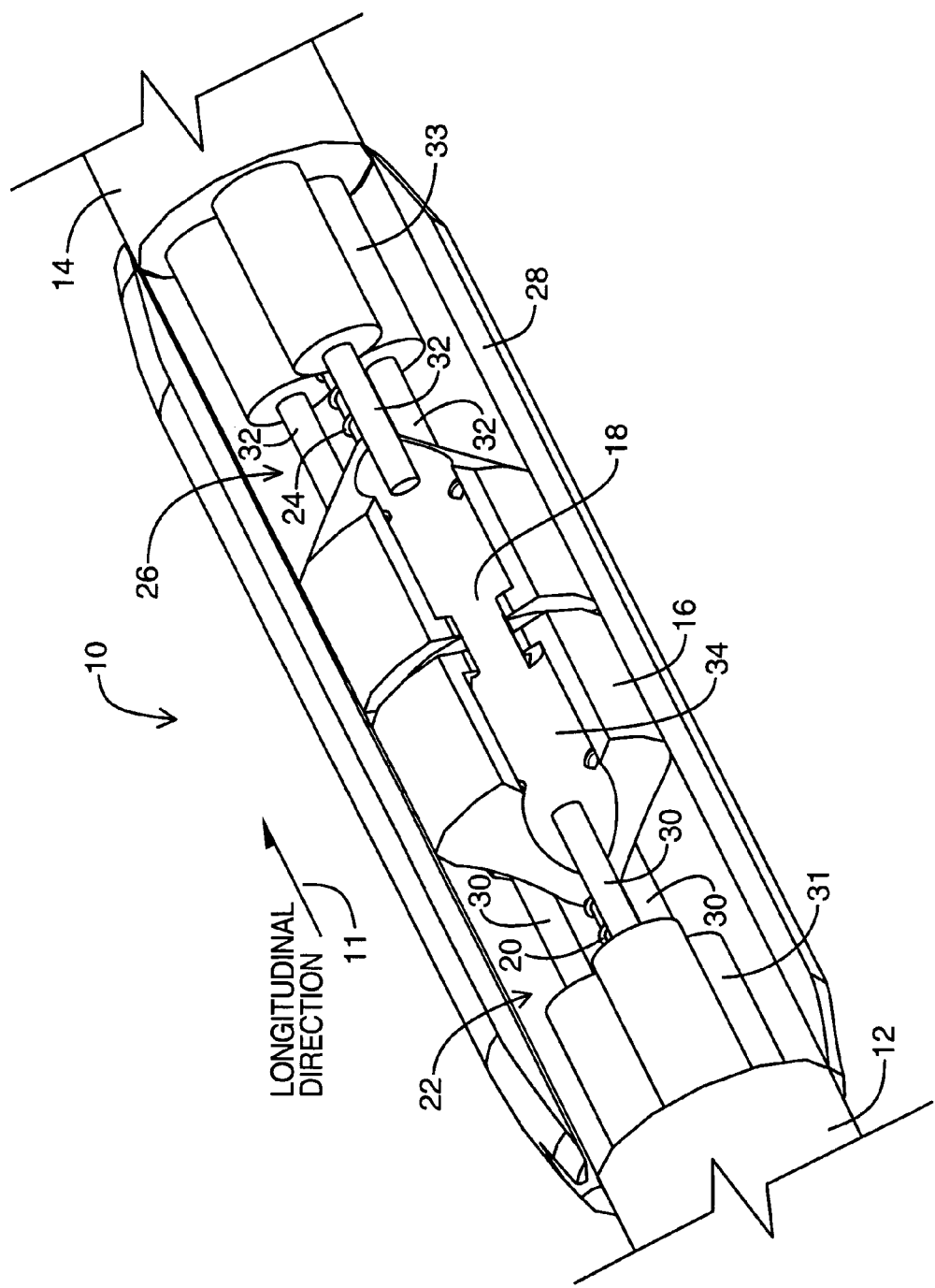
FIG. 1A is a partial cross-sectional longitudinal view of a device for splicing a first electrical cord and a second electrical cord.
Figure 1B:
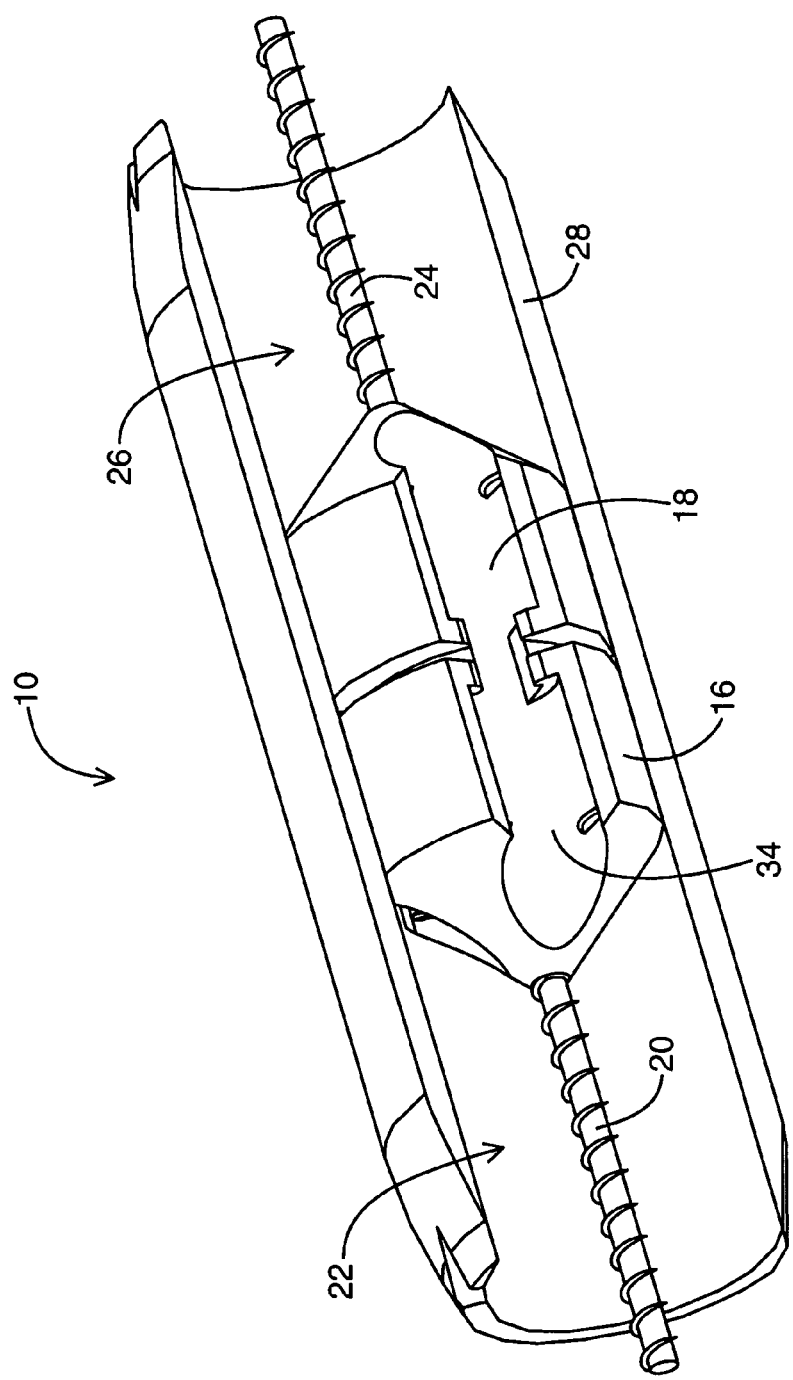
FIG. 1B is a partial cross-sectional longitudinal view of the splicing device of FIG. 1A without the electrical cords.

FIG. 1A shows a device 10 for splicing a first electrical cord 12 and a second electrical cord 14. For clarity, FIG. 1B shows the same device 10 without the electrical cords 12 and 14. The device 10 includes a connecting body 16 having M barrels 18, where M is an integer greater than zero. A barrel denotes a cavity in the connecting device 10 for receiving wires of the electrical cords 12 and 14. The device 10 also includes a first protrusion 20 at one end 22 of the connecting body 16 and a second protrusion 24 at an opposite end 26 of the connecting body 16. The device 10 further includes a sleeve 28 (only one half of which is shown in FIGS. 1A and 1B) that encloses at least a portion of the first protrusion 20, at least a portion of the second protrusion 24, and the connecting body 16.

Within the connecting body 16, N wires 30 of the first electrical cord 12 are electrically coupled to N wires 32 of the second electrical cord 14, where N is an integer satisfying $0 < N \leq M$. In the embodiment shown in FIG. 1A, the first electrical cord 12 and the second electrical cord 14 each has N=3 wires, and the connecting body 16 has M=3 barrels. The wires 30 and 32 are typically each covered with insulating covers 31 and 33. In a preferred embodiment, the connecting body 16 is one piece, and can be composed of high-density polyethylene (HDPE).

Each wire 30 of the first cord 12 is electrically coupled to a corresponding wire 32 of the second cord 14 within a respective barrel 18 (the wires are shown uncoupled in FIGS. 1A and 1B). Each barrel 18 has an opening 34 along a longitudinal direction 11 of the connecting body 16. The opening 34 facilitates the introduction into the barrel 18 of a wire 30 from the first cord 12 and a corresponding wire 32 from the second cord 14 for electrical coupling therebetween.

A portion of the first protrusion 20 is lodged inside the first cord 12, thereby securing the first cord 12 to the device 10. Likewise, a portion of the second protrusion 24 is lodged inside the second cord 14, securing the second cord 14 to the device 10.

Once the electrical cords 12 and 14 are spliced, they can operate to conduct electricity for various applications. It should be noted, however, that during this electrical operation, the first and second protrusions 20 and 24 are non-conducting (i.e., the protrusions 20 and 24 do not carry electricity during operation). Notwithstanding, the first and second protrusions 20 and 24 may be composed of a conducting material, such as an appropriate metal. In a preferred embodiment, the first and second protrusions 20 and 24 are composed of a non-conducting material, such as HDPE, to prevent a short circuit that could arise because of electrical contact with the protrusions 20 and 24 if the insulating cover of any of the wires 30 and 32 were to break.

The sleeve 28 encloses at least a portion of the first protrusion 20, at least a portion of the second protrusion 24, and the connecting body 16 to insulate exposed parts (where splicing occurs) of wires 30 and 32.

Figure 2A:
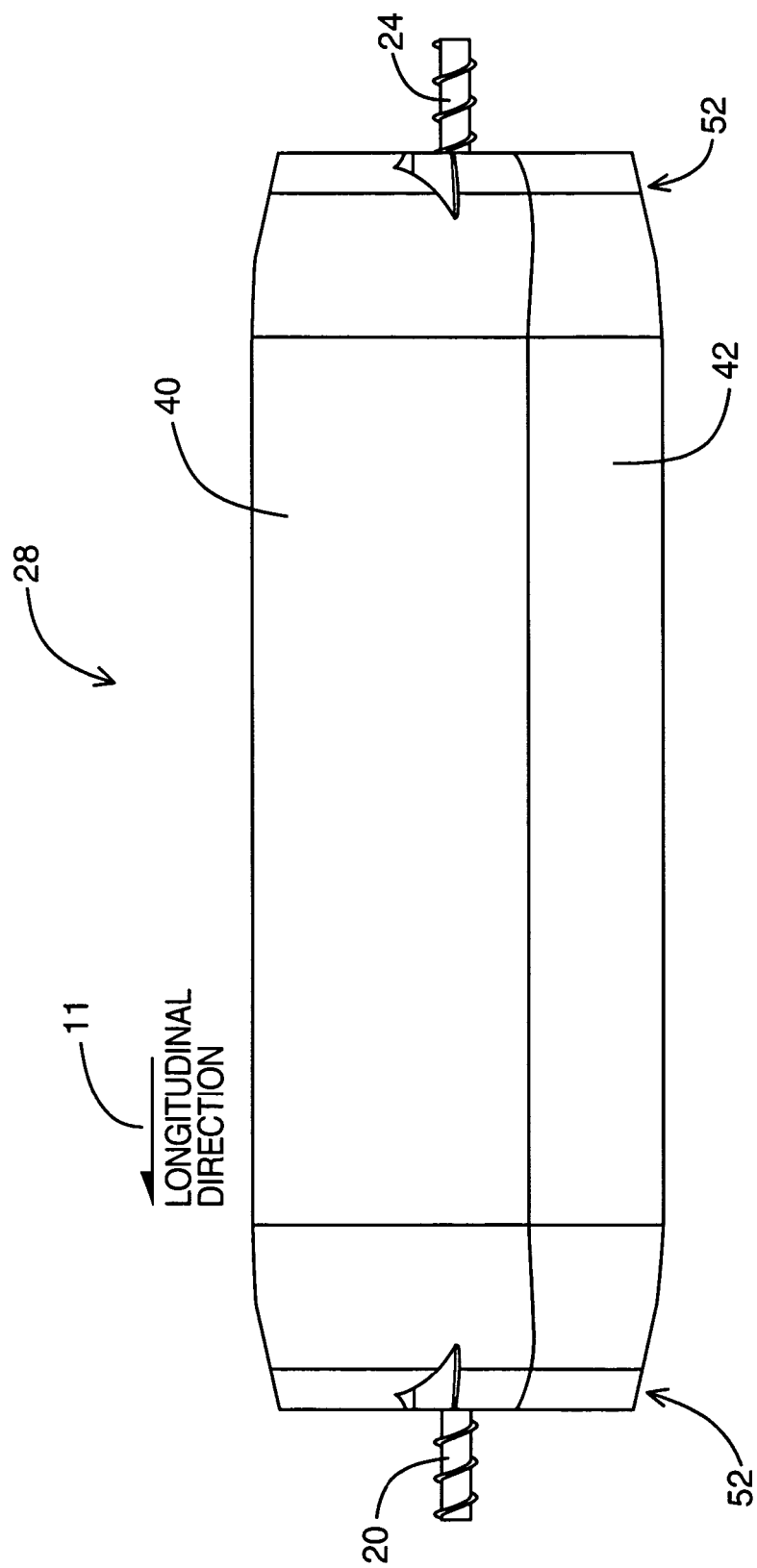
FIG. 2A shows a side view of the sleeve of FIG. 1A.
Figure 2B:
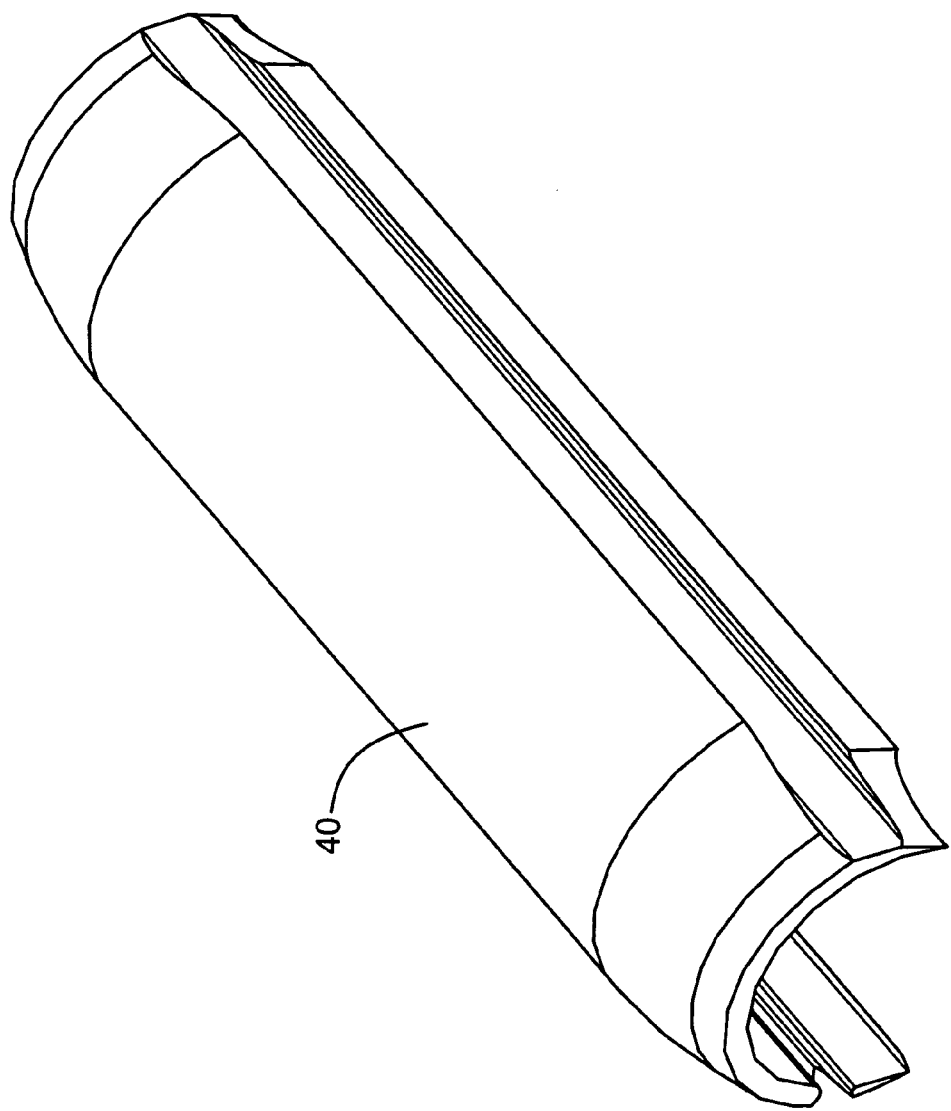
FIG. 2B shows a side perspective view of the sleeve of FIG. 1A.
Figure 2C:
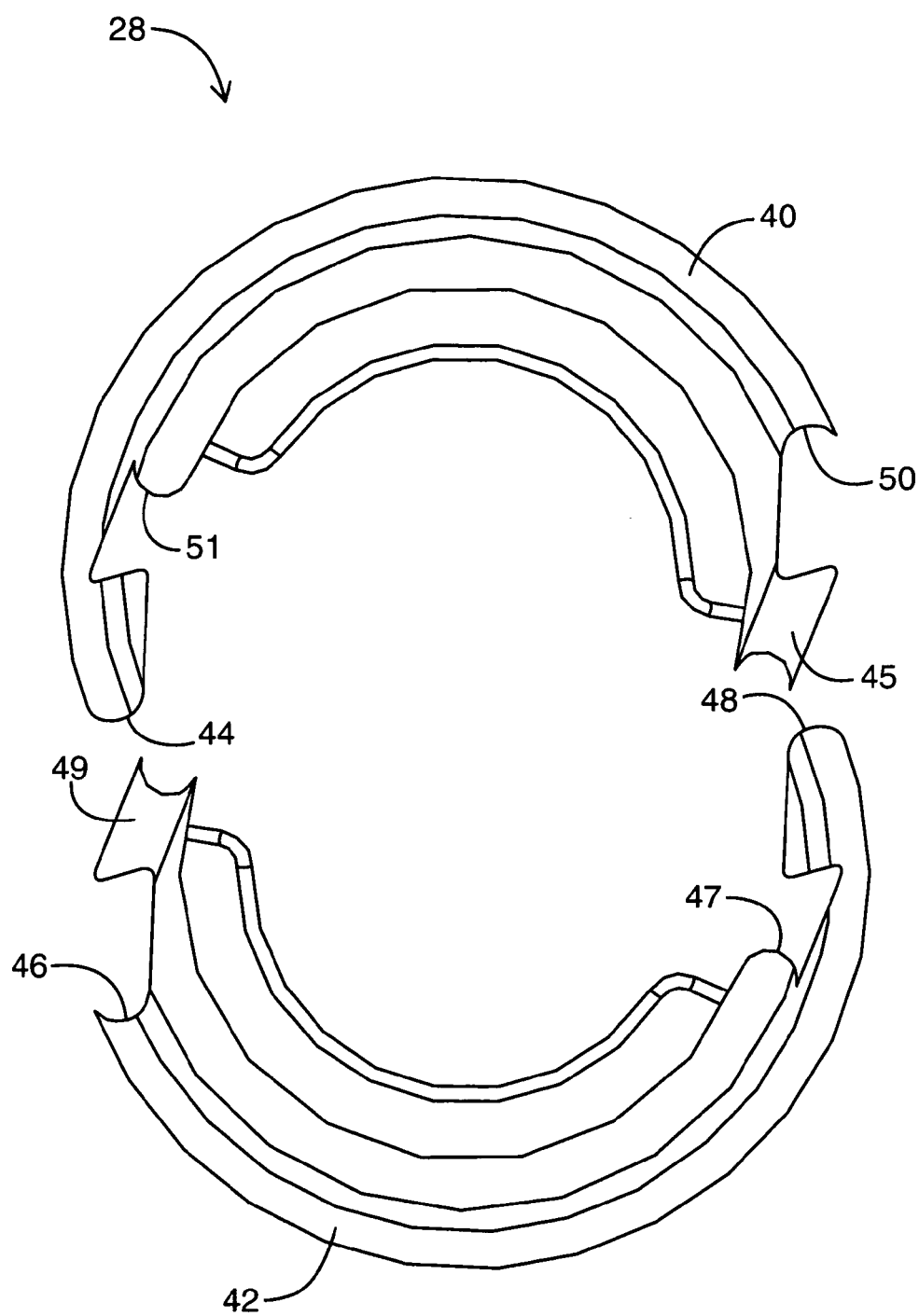
FIG. 2C shows an exploded end view of the sleeve of FIG. 1A.

FIGS. 2A, 2B and 2C show the sleeve 28 of FIG. 1A. As can be seen in FIG. 2A, the sleeve 28 includes two parts 40 and 42 that are attached together around the connecting body 16 (not shown in FIGS. 2A-2C). Only the part 40 of the sleeve 28 is shown in FIG. 2B. The sleeve 28 can be composed of HPDE, for instance, to insulate wires 30 and 32. The sleeve 28 can be manufactured using injection molding, for example. In one embodiment, the first sleeve part 40 is identical to the second sleeve part 42.

FIG. 2C shows an end view along the longitudinal direction 11 of the sleeve 28. Male parts 44 and 45 of the first sleeve part 40 can be snapped on to female receptors 46 and 47, respectively, of the second sleeve part 42. Likewise, male parts 48 and 49 of the second sleeve part 42 can be snapped on to female receptors 50 and 51, respectively, of the first sleeve part 40. It should be understood, that other fastening means besides snapping means could be used to lock both parts of the sleeve together, and that the sleeve 28 can comprise more than two parts. For example, in the example shown in FIG. 2A, the two parts 40 and 42 of the sleeve 28 interface along the longitudinal direction 11. In a different embodiment, the parts could interface in a plane perpendicular to the longitudinal direction 11.

As described in more detail below, the sleeve 28 is narrow enough at the ends 52, relative to the thickness of the electrical cords 12 and 14 (not shown in FIGS. 2A-2C), to exert a squeezing force on the electrical cords 12 and 14 to help secure the cords 12 and 14.

Figure 3:
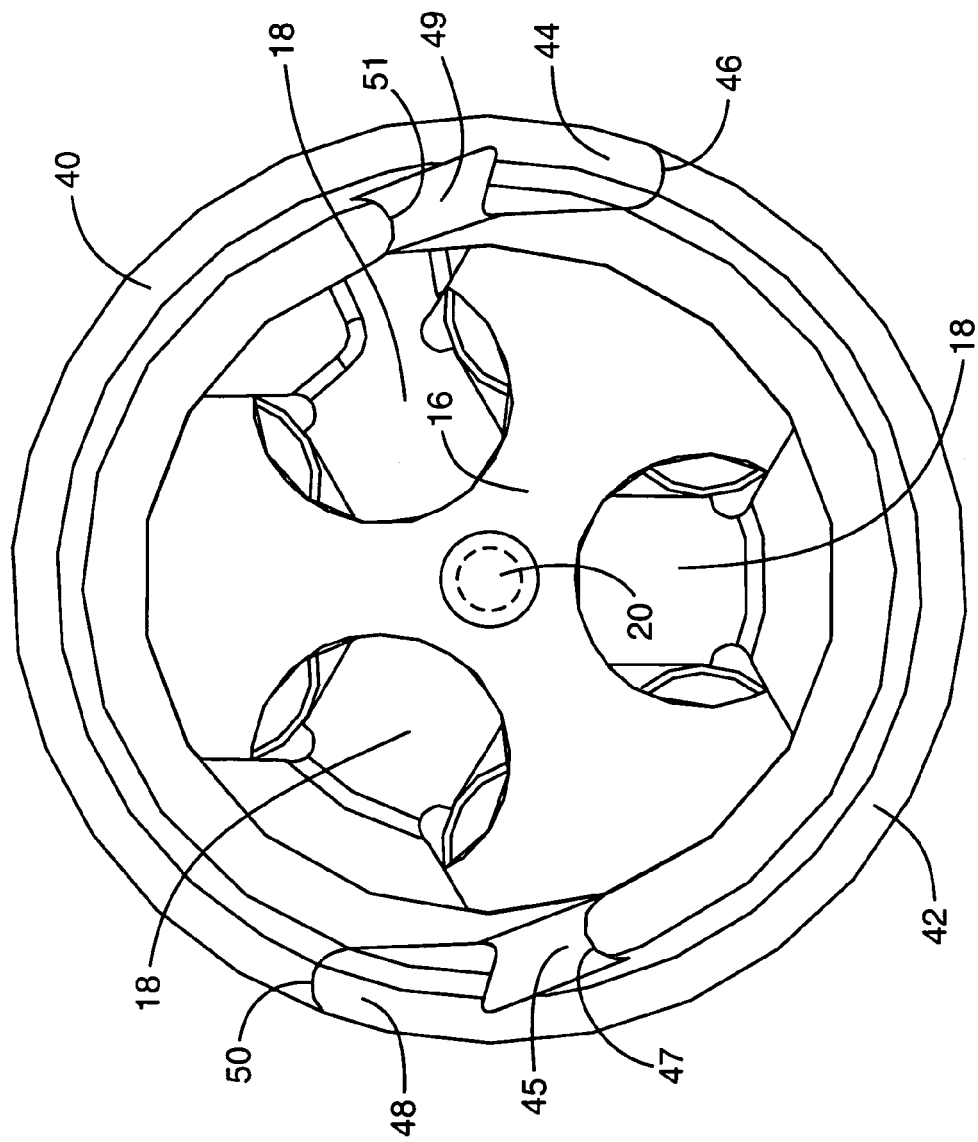
FIG. 3 shows an end view of the splicing device of FIG. 1A.

FIG. 3 shows an end view of the splicing device 10. The first and second parts 40 and 42 of the sleeve 28 are snapped together by mating of the male parts 44 and 45 of the first sleeve part 40 with the female receptors 46 and 47 of the second sleeve part 42. Likewise, the male parts 48 and 49 of the second sleeve part 42 are mated with the female receptors 50 and 51 of the first sleeve part 40. The sleeve 28 surrounds the connecting body 16. The connecting body 16 has M=3 barrels, one for each wire 30 of the first cord 12 and each wire 32 of the second cord 14. Three barrels 18 are appropriate when each cord 12 and 14 has three wires. However, the device 10 with three barrels 18 can be used to splice cords having one or two wires. In addition, splicing devices consistent with the present invention can have one, two, four or more barrels. In a preferred embodiment, $0 < N \leq M$, where M and N are the number of barrels and wires, respectively.

The device 10 for splicing can be made by injection molding, for example. A mold is provided for making the connecting body 16, the first protrusion 20 at one end 22 of the connecting body 16, and the second protrusion 24 at an opposite end 26 of the connecting body 16. A non-conducting material is then injected into the mold, and the material is then allowed to harden within the mold. After the mold is removed, the sleeve 28 is provided that encloses the connecting body 16.

Figure 4:
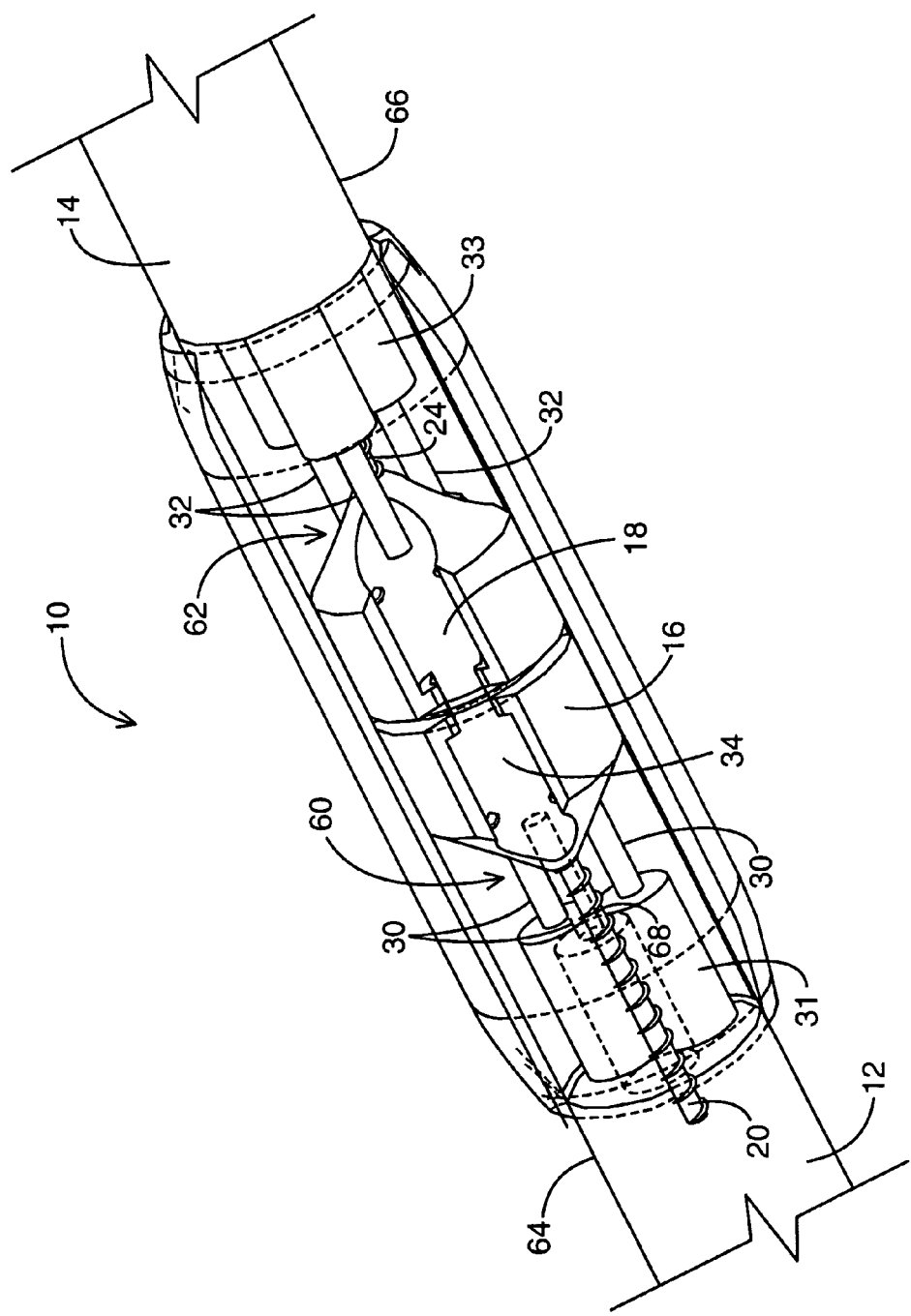
FIG. 4 is a partial cross-sectional longitudinal view of the splicing device of FIG. 1A.

FIG. 4 shows the splicing device 10 of FIG. 1A with the electrical cord 12 and associated wires 30 shown transparently, exposing the protrusions disposed between the wires 30. In the embodiment shown, the first protrusion 20 is a first screw attached at one end 60 of the connecting body 16, and the second protrusion 24 is a second screw attached at an opposite end 62 of the connecting body 16. Instead of screws, the protrusions can be nail-like objects, with or without ridges. In other embodiments, the protrusions can include small spikes along the surface to facilitate lodging of the protrusions in the electrical cords 12 and 14. In general, the protrusions can be any shape that allows the protrusions to be lodged into the cords to secure the first and second cords 12 and 14.

Each one of the electrical cords 12 and 14 includes N=3 wires 30 and 32, respectively, and is surrounded by insulating sheaths 64 and 66. The first protrusion 20 is screwed into a longitudinal space 68 between the three wires 30, and the second protrusion 24 is screwed into a longitudinal space (not shown) between the three wires 32. Each of the wires 30 is surrounded by an insulating cover 31. Likewise, each of the wires 32 is surrounded by an insulating cover 33. The insulating covers 31 and 33 of the wires are preferably not broken when the protrusions are lodged inside the electrical cords. If the covers 31 and 33 were to break, protrusions 20 and 24 that are non-conducting would help prevent a short-circuit.

The protrusions 20 and 24 are lodged between the respective wires 30, 32 between the respective insulating covers 31 and 33, and exert an outward force on the covers 31 and 33. This force is counteracted by the insulating sheaths 64 and 66. In addition, the sleeve 28 exerts a squeezing force on the insulating sheaths 64 and 66 that opposes the outward force exerted on the insulating covers 31 and 33 of the wires by the protrusions 20 and 24 to thereby secure the first and second cords 12 and 14.

In one embodiment, the first protrusion 20 is tapered such that a wider end thereof is attached to the connecting body 16 and a narrower end lies opposite. The narrower end facilitates the insertion of the protrusion 20 in between the wires 30 and 32. Likewise, the second protrusion 24 can be tapered.

Figure 5A:
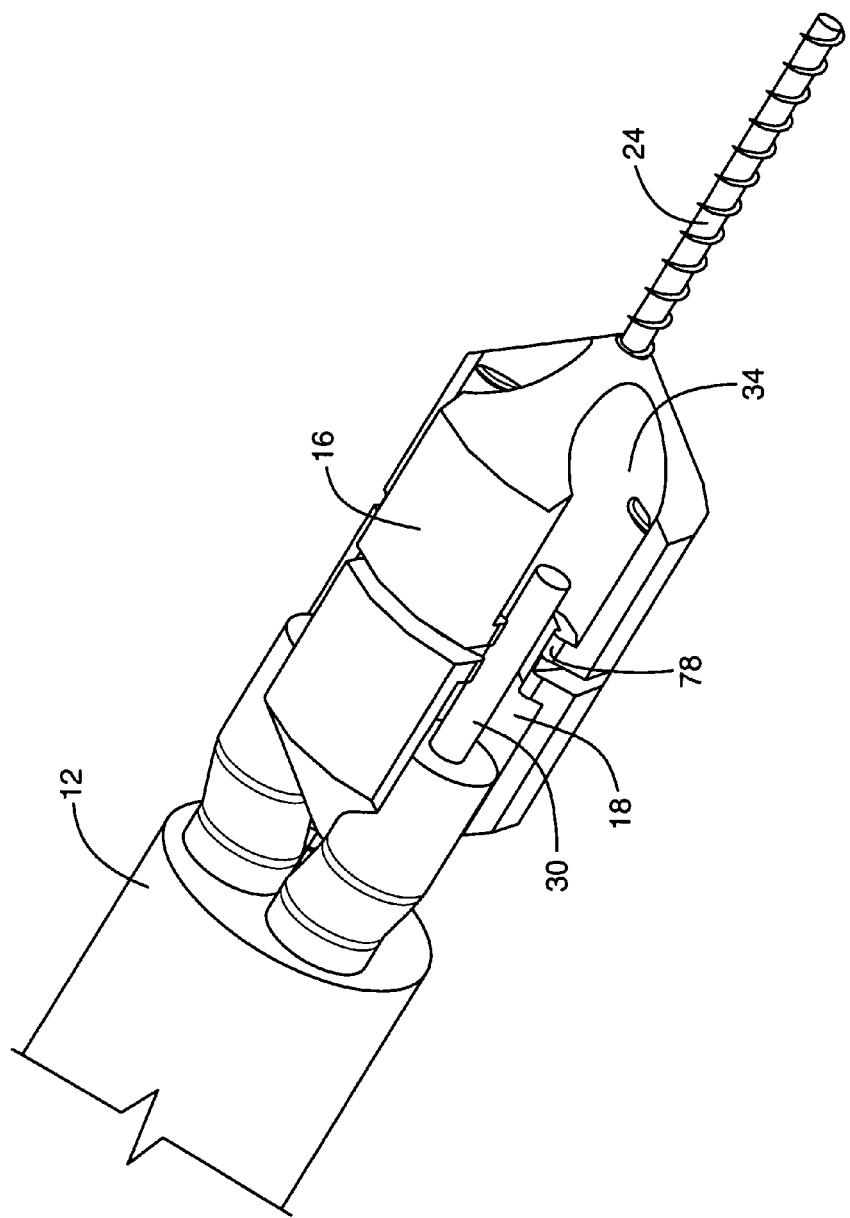
FIGS. 5A and 5B are side perspective views of the splicing device of FIG. 1A illustrating steps for splicing electrical wires.
Figure 5B:
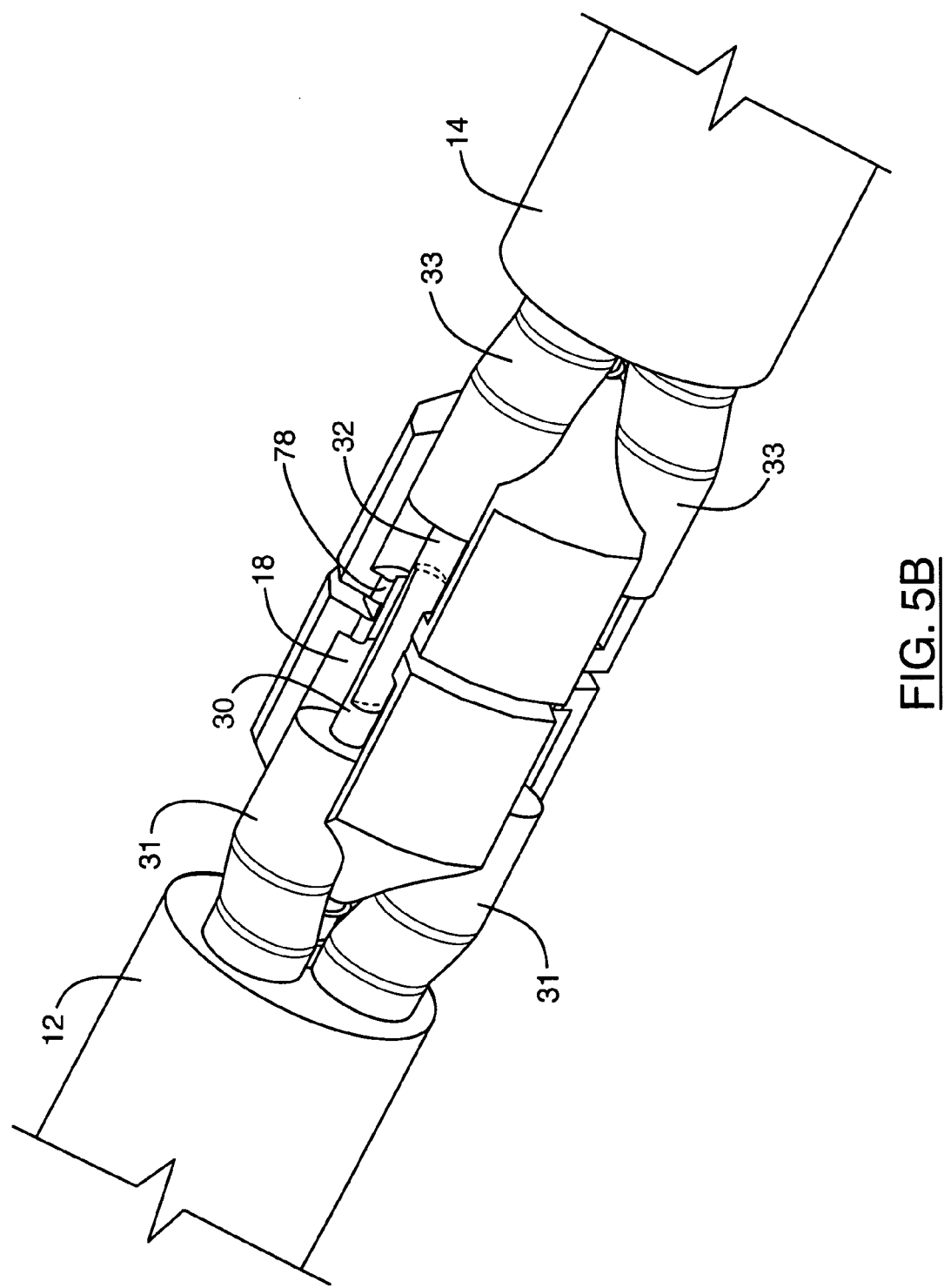

FIGS. 5A and 5B shows steps for splicing the electrical cords 12 and 14. Referring to FIG. 5A, one wire 30 of the first electrical cord 12 is placed in one of the barrels 18 of the connecting body 16 as shown. A portion of the wire 30 can extend past the midway point of the barrel 18 to ensure that there is sufficient area of the wire 30 to couple with the respective wire 32 (not shown in FIG. 5A). Referring to FIG. 5B, the second wire 32 can be similarly placed. Electrical coupling occurs where the two wires 30 and 32 overlap. Such coupling can be aided by pressing the two wires 30 and 32 together. A constriction 78 at the midway point of the barrel 18 helps secure the wires 30 and 32 for electrical coupling. The connecting body 16 allows each wire 30 of the first cord to come into direct contact with a corresponding wire of the second cord in a contact region, resulting in electrical coupling therebetween.

Advantageously, the design of the splicing device 10 accommodates a wide range of wire gauges. In particular, since there is no conducting member of the splicing device 10 that carries current during operation, no consideration need be given to whether the conducting member is large or small enough to carry the amount of current for which the electrical cords 12 and 14 are designed. By making the barrels 18 and the openings 34 of the barrels 18 sufficiently large, wires of various sizes can be spliced. In addition, the connecting body 16 and sleeve 28, while sufficiently stiff, have enough flex to accommodate a range of sizes. For example, the constriction 78 is sufficiently flexible to allow wires of various sizes to be wedged therein for coupling.

It should be understood that various modifications and adaptations could be made to the embodiments described and illustrated herein. For example, it is possible to splice K wires of one cord and N wires of a second cord within one barrel of the connecting device, where K and N are arbitrary, not necessarily equal, positive integers. For example, a first electrical cord can have three wires and a second electrical cord can have four wires. In such case, the wires can be spliced as in FIGS. 5A and 5B, but with one barrel containing one wire of the first electrical cord spliced with two wires of the second electrical cord, thereby forming a three-way wire junction within the barrel.

The scope of the present invention is defined in the appended claims.

What is claimed is:

1. A device for securely splicing two electrical cords, the device comprising
    a connecting body for electrically coupling at least one wire of a first electrical cord to at least one wire of a second electrical cord;
    a first protrusion at one end of the connecting body for mechanically securing the first cord to the device, said first protrusion having an outer surface with at least one raised element formed therein for firmly lodging a portion of the first protrusion inside the first cord; and
    a second protrusion at an opposite end of the connecting body for mechanically securing the second cord to the device, said second protusion having an outer surface with at least one raised element formed therein for firmly lodging a portion of the second protrusion inside the second cord, wherein, during electrical operation of the coupled electrical cords, the first and second protrusions are non-conducting.

2. The device of claim 1, further comprising a sleeve that encloses the connecting body.

3. The device of claim 2, wherein the sleeve includes two parts that releasably engage each other around the connecting body.

4. The device of claim 2, wherein the sleeve encloses at least a portion of the first protrusion and at least a portion of the second protrusion.

5. The device of claim 2, wherein the sleeve is composed of high-density polyethylene.

6. The device of claim 1, wherein the first protrusion, the second protrusion and the connecting body form one integral piece.

7. The device of claim 1, wherein the connecting body is composed of high-density polyethylene.

8. The device of claim 1, wherein the connecting body comprises at least one barrel for receiving a first wire from the first electrical cord and a second wire from the second electrical cord for splicing the first and second wires.

9. The device of claim 8, wherein each barrel has an opening along a longitudinal direction of the connecting body, said opening facilitating the introduction into the barrel of the first wire and the second wire.

10. The device of claim 9, wherein the connecting body has three barrels.

11. The device of claim 8, wherein each barrel comprises a constriction to secure the wires and facilitate electrical coupling of the wires.

12. The device of claim 1, wherein the first protrusion is a first screw adapted for screwing into the first electrical cord, and the second protrusion is a second screw adapted for screwing into the second electrical cord.

13. The device of claim 1, wherein
    the first protrusion is tapered such that a wider end thereof is attached to the connecting body and a narrower end lies opposite, and
    the second protrusion is tapered, such that a wider end thereof is attached to the connecting body and a narrower end lies opposite.

14. The device of claim 1, further comprising a sleeve that encloses the connecting body, at least a portion of the first protrusion and at least a portion of the second protrusion.

15. The device of claim 1, wherein at least one of the first and second protrusions has one of a ridged surface and a screw-like surface for firmly lodging in the electrical cord.

16. The device of claim 1, wherein at least one of the first and second protrusions has a plurality of small spikes on its surface for firmly lodging in the electrical cord.

17. A method for securely splicing two electrical cords with a splicing device, the method comprising
    electrically coupling K wires of a first electrical cord to N wires of a second electrical cord, where K and N are arbitrary positive integers, within a connecting body of the splicing device;
    firmly lodging inside the first cord at least a portion of a first protrusion disposed at one end of the connecting body where said first protrusion has an outer surface with at least one raised element formed therein for mechanically securing the first cord to the splicing device; and
    firmly lodging inside the second cord at least a portion of a second protrusion disposed at an opposite end of the connecting body where said second protrusion has an outer surface with at least one raised element formed therein for mechanically securing the second cord to the splicing device, wherein, during electrical operation of the coupled electrical cords, the first and second protrusions are non-conducting.

18. The method of claim 17, wherein K=N.

19. The method of claim 18, wherein the step of electrically coupling includes allowing each wire of the first cord to come into direct contact with a corresponding wire of the second cord.

20. The method of claim 18, further comprising enclosing the connecting body, at least a portion of the first protrusion and at least a portion of the second protrusion in a sleeve.

21. The method of claim 20, further comprising releasably engaging two parts that comprise the sleeve around the connecting body.

22. The method of claim 18, wherein the connecting body includes M barrels, where M is an integer at least as large as N, the method further comprising electrically coupling each wire of the first cord to a corresponding wire of the second cord within a respective barrel.

23. The method of claim 18, wherein N=3, the method further comprising
    screwing the first protrusion into a longitudinal space between the three wires of the first cord; and
    screwing the second protrusion into a longitudinal space between the three wires of the second cord.

24. A method of making a device for securely splicing two electrical cords, the method comprising
    providing a mold for making a connecting body for electrically coupling at least one wire of a first electrical cord to at least one wire of a second electrical cord,
    a first protrusion at one end of the connecting body for mechanically securing the first cord to the device, where said first protrusion has an outer surface with at least one raised element formed therein for firmly lodging inside the first cord, and
    a second protrusion at an opposite end of the connecting body where said second protrusion has an outer surface with at least one raised element formed therein for mechanically securing the second cord to the device;
    injecting a non-conducting material into the mold;
    allowing the material to harden within the mold;
    removing the mold; and
    providing a sleeve that encloses the connecting body.

* * * * *